United States Patent
Dai et al.

(10) Patent No.: US 8,407,424 B2
(45) Date of Patent: Mar. 26, 2013

(54) DATA COHERENCE METHOD AND APPARATUS FOR MULTI-NODE COMPUTER SYSTEM

(75) Inventors: Donglai Dai, Eau Claire, WI (US); Randal S. Passint, Chippewa Falls, WI (US)

(73) Assignee: Silicon Graphics International Corp., Fremont, CA (US)

( * ) Notice: Subject to any disclaimer, the term of this patent is extended or adjusted under 35 U.S.C. 154(b) by 965 days.

(21) Appl. No.: 11/268,164

(22) Filed: Nov. 7, 2005

(65) Prior Publication Data

US 2007/0106850 A1 May 10, 2007

(51) Int. Cl.
G06F 13/00 (2006.01)
G06F 13/28 (2006.01)
G06F 7/00 (2006.01)

(52) U.S. Cl. .................. 711/141; 711/122; 707/706

(58) Field of Classification Search ................. 709/229; 711/147, 141
See application file for complete search history.

(56) References Cited

U.S. PATENT DOCUMENTS

| | | | |
|---|---|---|---|
| 5,535,116 A * | 7/1996 | Gupta et al. | 700/5 |
| 5,613,136 A * | 3/1997 | Casavant et al. | 712/28 |
| 5,617,537 A * | 4/1997 | Yamada et al. | 709/214 |
| 5,659,714 A * | 8/1997 | Yoshida | 711/211 |
| 5,781,757 A * | 7/1998 | Deshpande | 711/146 |
| 5,859,975 A * | 1/1999 | Brewer et al. | 709/213 |
| 6,006,255 A * | 12/1999 | Hoover et al. | 709/216 |
| 6,122,659 A * | 9/2000 | Olnowich | 709/213 |
| 6,122,674 A * | 9/2000 | Olnowich | 709/250 |
| 6,209,065 B1 * | 3/2001 | Van Doren et al. | 711/150 |
| 6,275,907 B1 * | 8/2001 | Baumgartner et al. | 711/143 |
| 6,298,419 B1 * | 10/2001 | Kontothanassis et al. | 711/147 |
| 6,647,466 B2 * | 11/2003 | Steely, Jr. | 711/138 |
| 6,675,316 B1 * | 1/2004 | Harper | 714/4.3 |
| 6,697,919 B2 * | 2/2004 | Gharachorloo et al. | 711/141 |
| 6,725,343 B2 * | 4/2004 | Barroso et al. | 711/145 |
| 6,789,173 B1 * | 9/2004 | Tanaka et al. | 711/147 |
| 7,120,752 B2 * | 10/2006 | Wilson et al. | 711/135 |
| 7,213,106 B1 * | 5/2007 | Koster et al. | 711/119 |
| 7,389,300 B1 * | 6/2008 | Shah et al. | 1/1 |
| 7,765,520 B2 * | 7/2010 | Wagner et al. | 717/101 |
| 2003/0009640 A1 * | 1/2003 | Arimilli et al. | 711/147 |

(Continued)

OTHER PUBLICATIONS

Gupta, et al. *Reducing Memory and Traffic Requirements for Scalable Directory-Based Cache Coherence Schemes*, Computer Systems Laboratory, Stanford University, 1990, 10 pages.
Li, et al. *ADir_pNB: A Cost-Effective Way to Implement Full Map Directory-Based Cache Coherence Protocols*, IEEE, 2001, 14 pages.

*Primary Examiner* — Krisna Lim
*Assistant Examiner* — Margishi Desai
(74) *Attorney, Agent, or Firm* — Sunstein Kann Murphy & Timbers LLP (57) ABSTRACT

A method and apparatus for maintaining data coherency in a computer system having a plurality of nodes forms a directory by grouping the nodes into a plurality of hierarchical groups of two or more levels. The method and apparatus also 1) set the directory to have data relating to a first set of groups within a first level, and 2) determine if a requesting node requesting data is a member of one of the first set of groups. The directory then is set to have data relating to a second group of nodes if the requesting node is determined not to be a member of the first set of groups within the first level. The second group of nodes is in a higher level than the first level.

23 Claims, 6 Drawing Sheets

U.S. PATENT DOCUMENTS

| | | | |
|---|---|---|---|
| 2003/0217236 A1* | 11/2003 | Rowlands | 711/145 |
| 2005/0050029 A1* | 3/2005 | Suzuki | 707/3 |
| 2005/0198441 A1* | 9/2005 | Tokoro | 711/141 |
| 2005/0256887 A1* | 11/2005 | Eiron et al. | 707/100 |
| 2005/0273571 A1* | 12/2005 | Lyon et al. | 711/203 |
| 2006/0236038 A1* | 10/2006 | Hum et al. | 711/141 |

* cited by examiner

DATA COHERENCE METHOD AND APPARATUS FOR MULTI-NODE COMPUTER SYSTEM

FIELD OF THE INVENTION

The invention generally relates to multi-node computer systems and, more particularly, the invention relates to data coherency within multi-node computer systems.

BACKGROUND OF THE INVENTION

Large-scale shared memory multi-processor computer systems typically have a large number of processing nodes (e.g., with one or more microprocessors and local memory) that cooperate to perform a common task. For example, selected nodes on a multi-processor computer system may cooperate to multiply a complex matrix. To do this in a rapid and efficient manner, such computer systems typically divide the task into discrete parts that each are executed by one or more of the nodes.

When dividing a task, the nodes often share data. To that end, the microprocessors within the nodes each may access the memory of many of the other nodes. Those other microprocessors could be in the same node, or in different nodes. For example, a microprocessor may retrieve data from the memory of another node (the "home node"). Accordingly, rather than retrieving the data from the home node each time it is needed, the requesting microprocessor, as well as other microprocessors, may access their locally held copies (cached copies) to execute their local functions.

Problems arise, however, when the data that was retrieved and held by some other microprocessor changes, and such other microprocessor has not been notified of that change. When that happens, the locally held data may no longer be accurate, potentially corrupting operations that rely upon the retrieved data.

To mitigate these problems, computer systems that share data in this manner typically execute cache coherency protocols to ensure that locally held copy of the data is consistent with the data at the home node. Implementing cache coherency protocols on computer systems having many nodes, however, often requires a great deal of storage; specifically, among other things, each node may have a directory identifying any nodes having a copy of its data. The storage required by the directories undesirably can be greater than the storage required for storing the shared data. To minimize this high storage requirements, some systems undesirably limit the amount of sharing between microprocessors.

SUMMARY OF THE INVENTION

In accordance with one aspect of the invention, a method and apparatus for maintaining data coherency in a computer system having a plurality of nodes forms a directory by grouping the nodes into a plurality of hierarchical groups of two or more levels. The method and apparatus also 1) set the directory to have data relating to a first set of groups within a first level, and 2) determine if a requesting node requesting data is a member of one of the first set of groups. The directory then is set to have data relating to a second group of nodes if the requesting node is determined not to be a member of the first set of groups within the first level. The second group of nodes is in a higher level than the first level. It should be noted that the terms "first" and "second" are not intended to imply a higher or lower level. Those terms simply are meant to distinguish between the various terms.

Each node may be a member of at least one group in each level, and each level may have a plurality of sets of groups. Each group in the higher level may include a plurality of groups in the lower level. After setting the directory to have data relating to the second group of nodes, some embodiments determine if the requesting node is a member of the second group of nodes. The method and apparatus then may forward a coherence message to at least one of the nodes in the second group if it is determined that the requesting node is a member of the second group. The coherence message has information relating to the state of the requested data.

In alternative embodiments, the requesting node is a member of a given group that is one of the plurality of hierarchical groups. The method and apparatus thus may determine if the directory has data indicating that one of the members of the given group has access to the data requested from the requesting node. If it is determined that the directory does not have data indicating that the given group has at least one node with access to the data requested from the requesting node, then the method and apparatus may modify the directory in a specified manner. Specifically, this modification may cause the directory to have data indicating that the given group has at least one node with access to the data requested from the requesting node.

To optimize storage requirements, the directory may have a multi-dimensional data structure for storing information relating to the different groups. Moreover, the method and apparatus may increase the level of the directory until it has been determined that the requesting node is a member of at least one group identified by the directory.

In accordance with another aspect of the invention, a memory controller for maintaining data coherency in a multi-node computer system has a grouping module that forms a directory by grouping the nodes into a plurality of hierarchical groups of two or more levels. The directory initially is set to have data relating to a first set of groups within a first level. The controller also has 1) a membership module (operatively coupled with the grouping module), for determining if a requesting node requesting data is a member of one of the first set of groups, and 2) a level module (operatively coupled with the membership module) for setting the directory to have data relating to a second group of nodes if the requesting node is determined not to be a member of the first set of groups within the first level. In a manner similar to other aspects of the invention, the second group of nodes is in a higher level than that of the first level.

In some embodiments, the requesting node is a member of a given group that is one of the plurality of hierarchical groups. The controller thus also has 1) a parser that determines if the directory has data indicating that one of the members of the given group has access to the data requested from the requesting node, and 2) a modifier (operatively coupled with the parser) that modifies the directory to have data indicating that the given group has at least one node with access to the data requested from the requesting node. The modifier modifies the directory in the noted manner if it is determined that the directory does not have data indicating that the given group has at least one node with access to the data requested from the requesting node.

Illustrative embodiments of the invention are implemented as a computer program product having a computer usable medium with computer readable program code thereon. The computer readable code may be read and utilized by a computer system in accordance with conventional processes.

BRIEF DESCRIPTION OF THE DRAWINGS

The foregoing advantages of the invention will be appreciated more fully from the following further description thereof with reference to the accompanying drawings wherein.

DESCRIPTION OF ILLUSTRATIVE EMBODIMENTS

In illustrative embodiments, a multi-node computer system uses a dynamic, hierarchical memory directory to ensure data coherency between nodes. Details of illustrative embodiments are discussed below.

Figure 1:
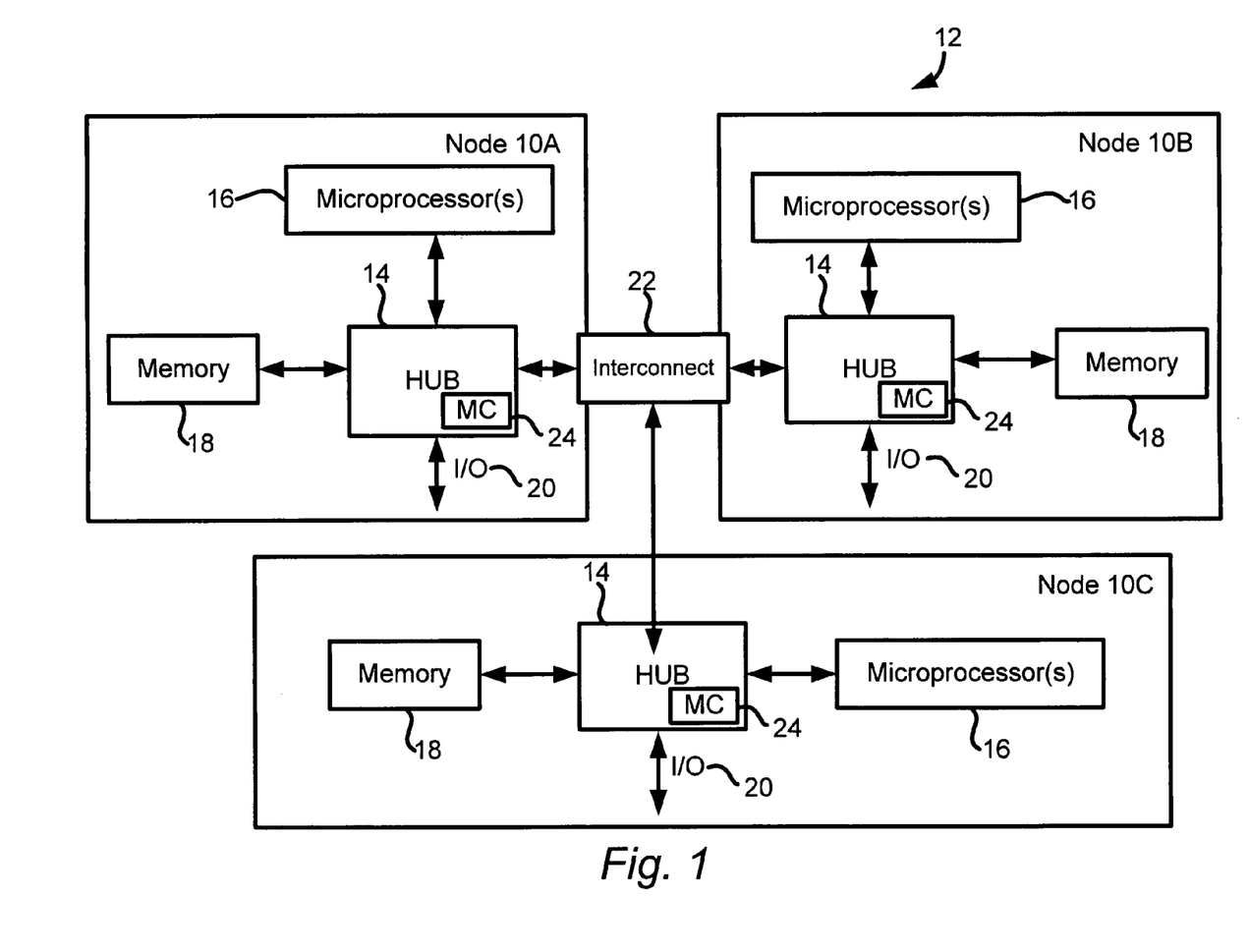
FIG. 1 schematically shows a multi-node computer system that may implement illustrative embodiments of the invention.

FIG. 1 schematically shows three nodes 10A-10C of a multi-processor/multi-node computer system 12 that can be configured in accordance with illustrative embodiments of the invention. The nodes 10A-10C respectively are identified as node 10A, node 10B, and node 10C and illustratively have the same general components. Specifically, each node 10A-10C has a plurality of components coordinated by a HUB chip 14. In illustrative embodiments, the HUB chip 14 is a gate array chip customized to perform a number of functions, including those discussed below. The HUB chip 14 also may include a microprocessor instead of, or in addition to, the gate arrays.

The components coupled with the HUB chip 14 include one or more microprocessors 16 with local caches, memory 18 for storing data, and an I/O interface 20 for communicating with devices that are external to the computer system 12. Although shown in FIG. 1 as being connected with the HUB chip 14, other embodiments connect the memory 18 to other modules, such as to their microprocessors 16.

The components also include an interconnect 22 to other nodes 10A-10C in the computer system 12. In illustrative embodiments, the HUB chip 14 implements a memory controller 24 that, in addition to performing other functions (e.g., generally controlling the memory 18), ensures coherency between nodes 10. Details of the memory controller 24 are discussed below.

In one exemplary system 12, the microprocessors 16 include two ITANIUM microprocessors (distributed by Intel Corporation of Santa Clara, Calif.) that generate 128 bit words for storage in a plurality of dual in-line memory modules (shown schematically as memory 18 in FIG. 1). Each DIMM illustratively has eighteen X4-type random access memory chips (e.g., DRAM chips) for storing data generated by the microprocessors 16, and is connected to one of four 72 bit buses (not shown). Accordingly, the HUB chip 14 may transfer 72 bits of data across each bus per clock cycle. The buses illustratively operate independently and transmit data in a synchronized manner.

The microprocessors 16 on the three nodes 10A-10C cooperate to perform a common task. For example, at least one of the microprocessors 16 on each of the nodes 10A-10C may share responsibilities with those on the other nodes 10A-10C for multiplying a complex matrix. To that end, certain data to be processed may be located on one of the nodes 10A-10C and thus, must be accessed by the other two nodes 10A-10C to complete their required operation. Such data may be in the cache of the microprocessors 16, in the memory 18, or in both locations. Continuing with the above example, node 10A may have data that nodes 10B, 10C must retrieve and process. In this case, node 10A is considered to be the "home node 10A," while nodes 10B, 10C are considered to be the "remote nodes 10B, 10C" or "requesting nodes 10B, 10C." It should be noted, however, that discussion of these three specific nodes 10A-10C is exemplary and thus, not intended to limit all aspects of the invention. Accordingly, this discussion applies to multi-node computer systems 12 having more nodes 10 (e.g., hundreds or thousands of nodes) or fewer nodes 10.

In a manner similar to other multi-node computer systems, each memory controller 24 maintains a record of all nodes 10 having copies of data that resides on the home node 10. This record is referred to as a "memory directory 25" (see below discussion with regard to FIGS. 3-6 for more details). For example, if a microprocessor 16 can generate given data, then that microprocessor 16 is considered to be the "owner" of that data. Accordingly, microprocessors 16 on nodes 10B and 10C must request access to the given data if they are to access it. In fact, even a second microprocessor 16 on node 10A also must request access to the given data if it is to access it. The memory controller 24 facilitates this access.

Each node's memory controller 24 therefore controls a memory directory 25 for each block of each memory 18 on each node 10. To simplify this discussion (see FIG. 2), however, nodes 10 with a single microprocessor 16 having a single block are mentioned. Of course, those skilled in the art should understand that the discussed principles apply equally to systems with nodes 10 having multiple blocks in memory 18 and multiple microprocessors 16.

In accordance with illustrative embodiments, each memory directory 25 is arranged in a dynamic, hierarchical manner to identify all nodes 10 having data controlled/owned by a microprocessor 16 at its home node 10. Specifically, upon receipt of a data request from a microprocessor on any node 10, the relevant memory controller 24 first determines if its memory directory 25 has any information, at all, relating to the requesting node 10. If it does, then the memory controller 24 can parse such information to determine if the remote node 10 could have a copy of the requested data. Appropriate directory settings may be made if that parsing shows that the memory directory 25 requires an update to show that the remote node 10 could have a copy of the requested data.

Conversely, if the directory 25 does not have information relating to the requesting node 10, then the memory controller 24 switches the memory directory 25 to a level having node groups with more and/or different nodes 10 (i.e., a higher level). This process iterates until the local memory directory 25 has information relating to the remote node 10 making the request. At that point, the memory controller 24 can set the directory 25 to show that such requesting node 10 has the data. This process is discussed in greater detail with regard to FIG. 6.

Figure 2:
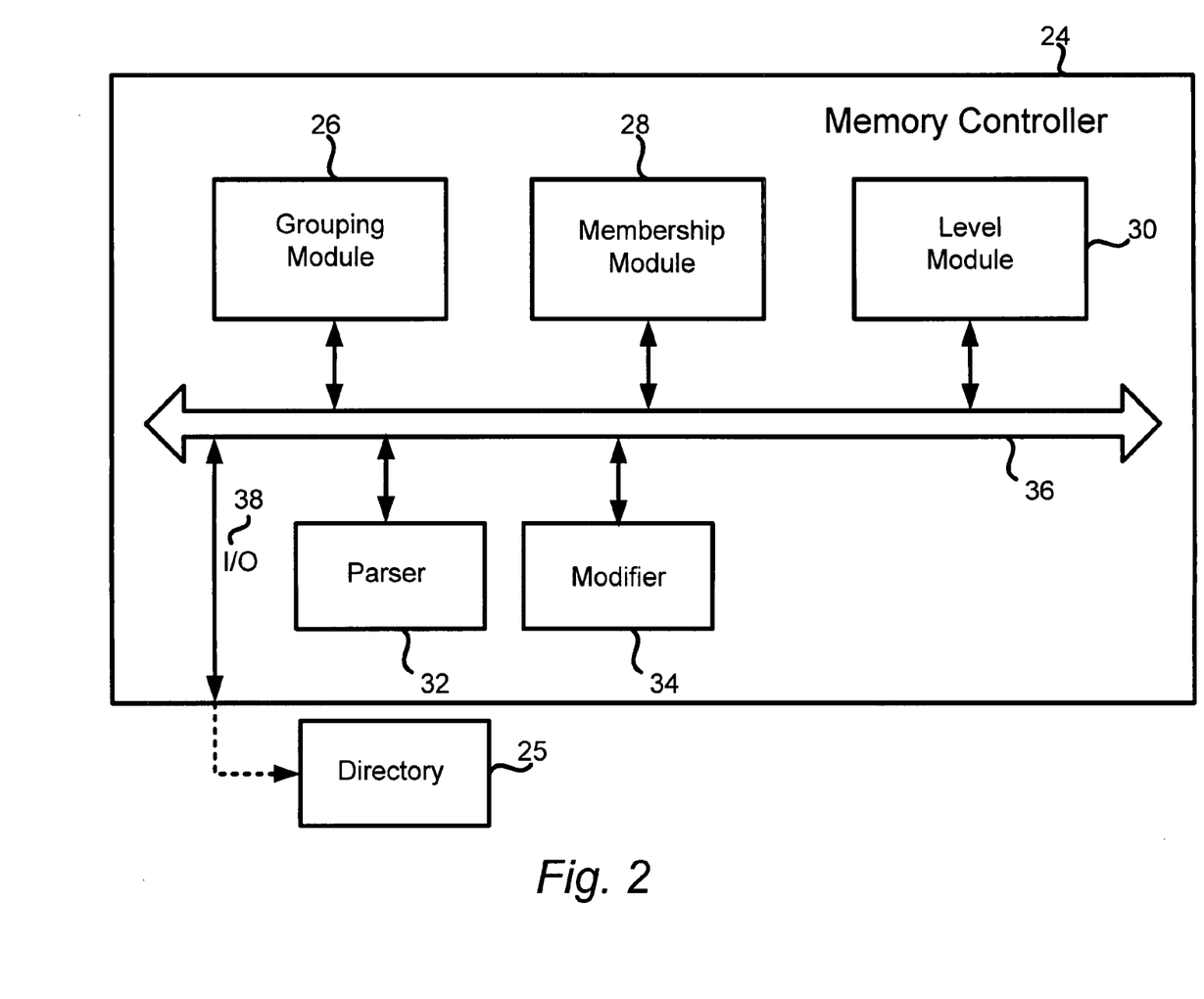
FIG. 2 schematically shows a memory controller implemented in accordance with illustrative embodiments of the invention.

FIG. 2 schematically shows additional details of the memory controller 24, including various functional components that accomplish the noted goals. As a preliminary matter, it should be noted that schematically identifying some of the functional components shown in FIG. 2 as "modules" is not intended to characterize them as independently operating entities only. Instead, in addition to the possibility of being implemented as independently operating entities, each module may share functional components with other modules, include multiple independent functional components to effectuate its function, or both (among other things). The functional modules may use specially configured hardware (e.g., application specific integrated circuits, microprocessors, gate arrays, etc . . . ) and/or software to accomplish their goals. Designating the functional components as "modules" therefore is for convenience purposes only.

As shown in FIG. 2, the memory controller 24 has a grouping module 26 that groups nodes 10 into a plurality of hierarchical groups of two or more levels for use with the memory directory 25. Among other ways, the grouping module 26 may retrieve data identifying the actual node groupings from a look-up table in read only memory listing the nodes 10 and their respective groups. In other embodiments, the grouping module 26 may form the groups based upon some algorithm, such as with hardware logic.

The memory controller 24 also has a membership module 28 for determining if a requesting node 10 is a member of any group in the memory directory 25 at a specified level, and a level module 30 for controlling the level of the memory directory 25. In addition, the memory controller 24 also has a parser 32 for determining which nodes 10 have access to the requested data, and a modifier 34 for modifying the memory directory 25 as required (e.g., to update the memory directory 25 when a remote node 10 previously without a prior copy of the requested data subsequently obtains that data). The functional modules communicate via a central bus 36, or any other interconnection apparatus as required by the application. An I/O port 38 enables the memory controller 24 to communicate with external components, such as the memory directory 25 if it is off-chip. These components also perform additional functions consistent with this discussion.

Those skilled in the art should notice that the memory controller 24 has a number of other functional modules not shown in FIG. 2. For example, the memory controller 24 may have one or more functional modules for controlling data flow to and from the memory 18. The other functional modules nevertheless have been omitted to simplify this discussion.

At system startup, when some new shared data is stored by a home node, or at some other time specified by the application, the local memory directory 25 should be initialized. In short, the memory directory 25 illustratively is a two dimensional array having information relating to groups of nodes 10 represented at each block of the grid ("grid blocks"). This two dimensional array is addressed by means of a binary string having, among other things, a set of bits representing the columns of the array, and a set of bits representing the rows of the array.

Figure 3:
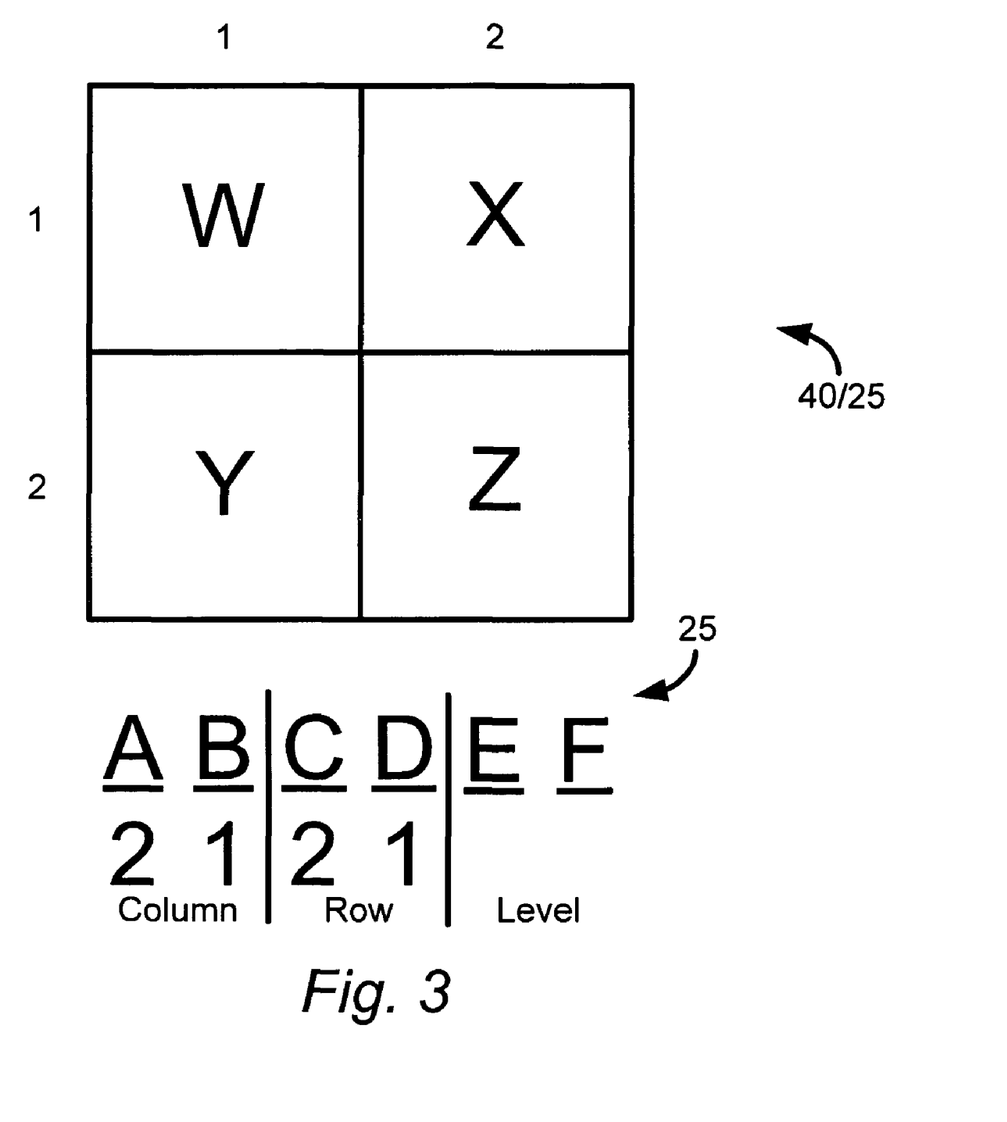
FIG. 3 schematically shows graphic representation of an exemplary memory directory configured in accordance with illustrative embodiments of the invention.

FIG. 3 schematically shows a simplified example of a memory directory 25 configured in accordance with illustrative embodiments of the invention. That figure includes six bits of addressing data (i.e., the memory directory 25), and a logical grid representation of the memory directory 25 in the form of a two dimensional array 40. The address bits are identified as Bits A and B for column data in the grid, Bits C and D for row data in the grid, and Bits E and F identifying the level (see discussion regarding FIG. 5 for additional details on levels). Each grid-block W, X, Y, and Z of the grid represents a group of nodes 10, discussed below.

Because the exemplary array 40 is a simple 2×2 array, Bits A and B respectively represent columns 2 and 1, while Bits C and D respectively represent rows 2 and 1. In addition, the two level bits (E and F) are a binary representation of four levels.

As an example, if the memory directory 25 of FIG. 3 is set to Level 1, the memory directory 25 would read as follows in the noted situations:

Only Grid-block W set: 0 1 0 1 0 1,
Only Grid-block X set: 1 0 0 1 0 1,
Only Grid-block Y set: 0 1 1 0 0 1, and
Only Grid-block Z set: 1 0 1 0 0 1

Illustrative embodiments, however, can populate the memory directory 25 to have data relating to more than one grid-block. To that end, the memory controller 24 sets additional memory directory bits, as needed. For example, if the memory directory 25 is to have data relating to both grid-blocks W and X at Level 1, then the memory directory 25 would read as follows:

1 1 0 1 0 1

Continuing with this example, if the memory directory 25 is to have data relating to each of grid-blocks W, X, and Z at level 1, then the memory directory 25 would read as follows:

1 1 1 1 0 1

It should be noted that in addition to suggesting that nodes 10 represented by Grid-blocks W, X, and Z have shared data, this directory encoding designation also suggests that nodes 10 at Grid-block Y also have such data. For this and other reasons, illustrative embodiments consider the data in the memory directory 25 to be an approximation of the nodes 10 having such data. Specifically, the data in the memory directory 25 should be interpreted to mean that at least the nodes 10 it identifies have the noted data—some nodes 10 listed thus may not have such data. Higher levels therefore can produce more coarse results (i.e., more nodes that do not have the required data). Details of how the memory controller 24 manages this is addressed below with regard to FIG. 6.

Figure 4:
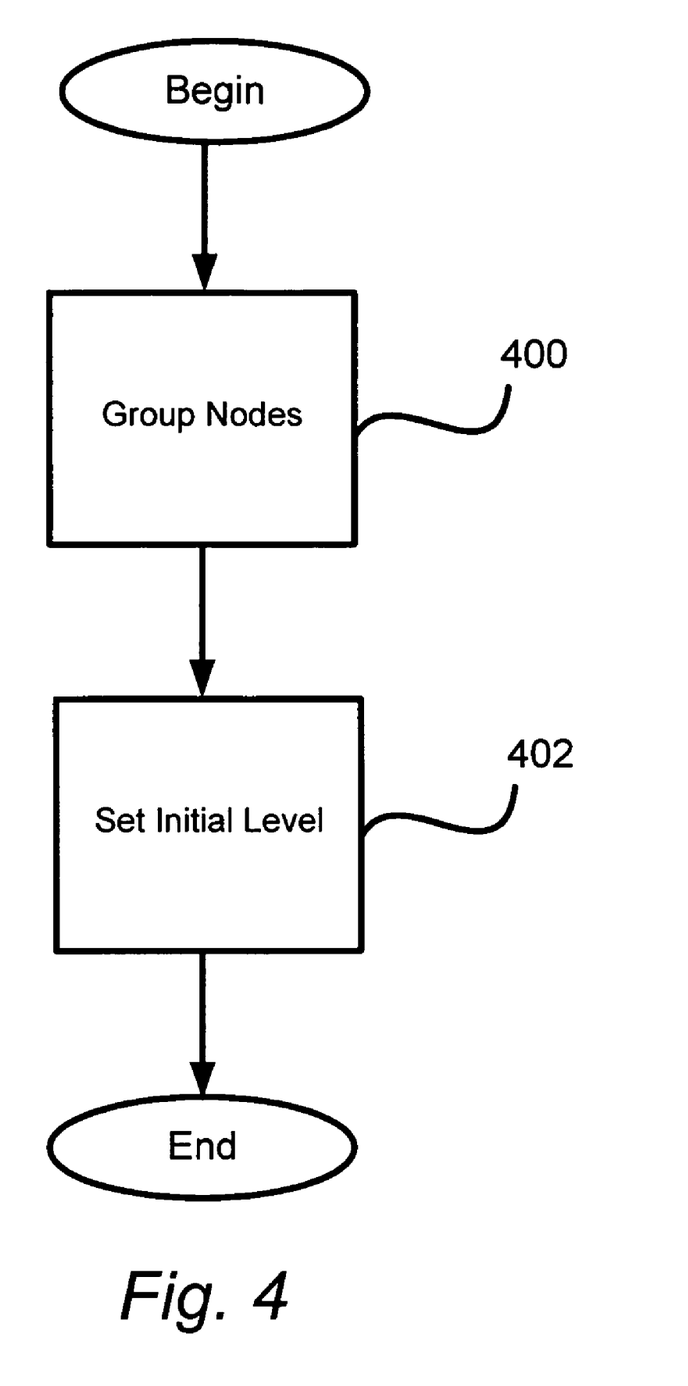
FIG. 4 shows a process of initializing a memory directory in accordance with illustrative embodiments of the invention.

FIG. 4 shows a process of initializing the memory directory 25 in accordance with illustrative embodiments of the invention. The process begins at step 400, which groups nodes 10 into a hierarchical format. More specifically, in illustrative embodiments, the nodes 10 are logically grouped into four levels of hierarchical groups ranging from Level 0 (lowest) to Level 3 (highest). Continuing with the example, the nodes 10 illustratively may be grouped as follows:

Level 0: Each Level 0 group consists of one node 10,
Level 1: Each Level 1 group consists of two Level 0 groups,
Level 2: Each Level 2 group consists of two Level 1 groups,
Level 3: Each Level 3 group consists of two Level 2 groups.

Figure 5:
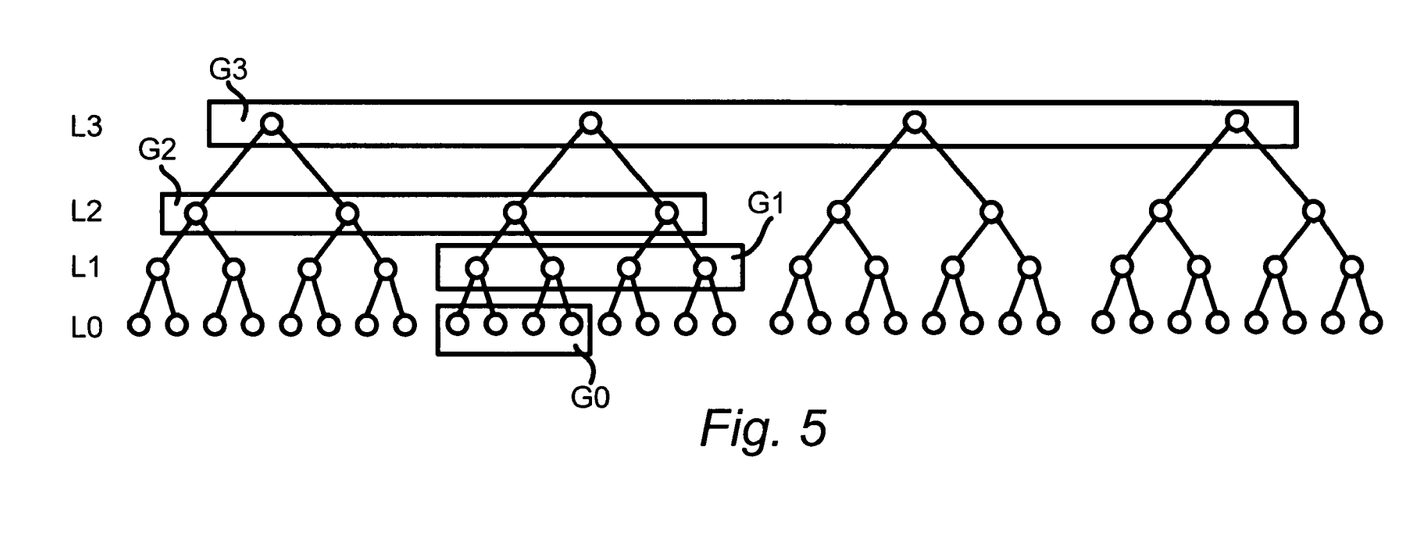
FIG. 5 schematically shows an example of a hierarchical tree structure that may be used in accordance with illustrative embodiments of the invention.

FIG. 5 schematically shows a tree structure detailing an example of this grouping with 32 nodes 10. This tree structure can be used with the memory directory 25 shown in FIG. 3. Each circle in the tree structure represents a node 10.

As shown, each group in Level 0 (L0 in the figure) simply is a single node 10. Each group in Level 1 (L1 in the figure) has two Level 0 groups and thus, has two nodes 10. In a like manner, each group in Level 2 (L2 in the figure) has two Level 1 groups (four nodes 10) while each group in Level 3 (L3 in the figures) has two Level 2 groups (eight nodes 10). Accordingly, each node 10 is a member of at least one group in each level. Moreover, in illustrative embodiments, the memory controller 24 assigns a group ID number to each group in each level, and maintain a listing of all groups and the nodes 10 in those groups. Such listing illustratively is pre-specified (or set in memory 18) as early as at system startup. Some embodiments group the home node 10 within one of the groups, while others do not group the home node 10.

In all levels of the hierarchy, all nodes 10 preferably are organized so that members of each group are physically close to each other within the overall computer system 12. In other words, each node 10 preferably is grouped with its relative neighbors within the computer system 12. Consider, for example, a 32 node system 12 (e.g., see FIG. 5) having each of its nodes 10 identified by consecutively numbered node ID numbers 0-31. Other than the first and last nodes 10, each node 10 in such system 12 is physically immediately adjacent to the nodes 10 having node ID numbers immediately preceding and immediately succeeding its node ID number (i.e., neighboring nodes 10).

In that case, illustrative embodiments group the Level 1 groups of FIG. 5 so that nodes 0 and 1 are in a first Level 1 group, nodes 2 and 3 are in a second Level 1 group, nodes 4 and 5 are in a third Level 1 group, nodes 6 and 7 are in a fourth Level 1 group, etc.... In a similar manner, nodes 0-3 are in a first Level 2 group, nodes 4-7 are in a second Level 2 group, etc.... This pattern of grouping continues to the highest level. Compared to other groupings that do not group adjacent nodes 10, this grouping is expected to introduce less aliasing as the level increases, thus reducing data transmission latency between nodes 10 and improving system performance. FIG. 5 shows various illustrative groupings, identified as G0-G3, representing groupings in levels L0-L3, respectively.

It should be noted that this type of hierarchical grouping is for illustrative purposes only. Other hierarchical groupings could be used, such as those with more levels, additional or fewer dimensions (e.g., one dimensional memory directory 25 or three dimensional memory directory 25), or those having more or less than two preceding groups making up an immediately succeeding group. For example, different levels could have different ways of grouping. It should be noted that other embodiments may use multiple ways of organizing the trees, such as having more than one link for ascending levels. Accordingly, the groupings shown in FIGS. 3 and 5 are to illustrate some embodiments of the invention only.

As noted above, this grouping can be executed in a number of manners. In illustrative embodiments, the grouping is pre-specified in read only memory that can be accessed by the grouping module 26. In alternative embodiments, rather than forming the groups by simply reading from read only memory, the grouping module 26 may have logic for providing the necessary grouping.

Returning to FIG. 4, after the nodes 10 are grouped, the process continues to step 402, in which the level module 30 zeros the memory directory 25 (i.e., sets all row, column, and level bits in the memory directory 25 to zero). The memory controller 24 then may begin populating the memory directory 25 as the requesting nodes 10 request the local data.

Figure 6:
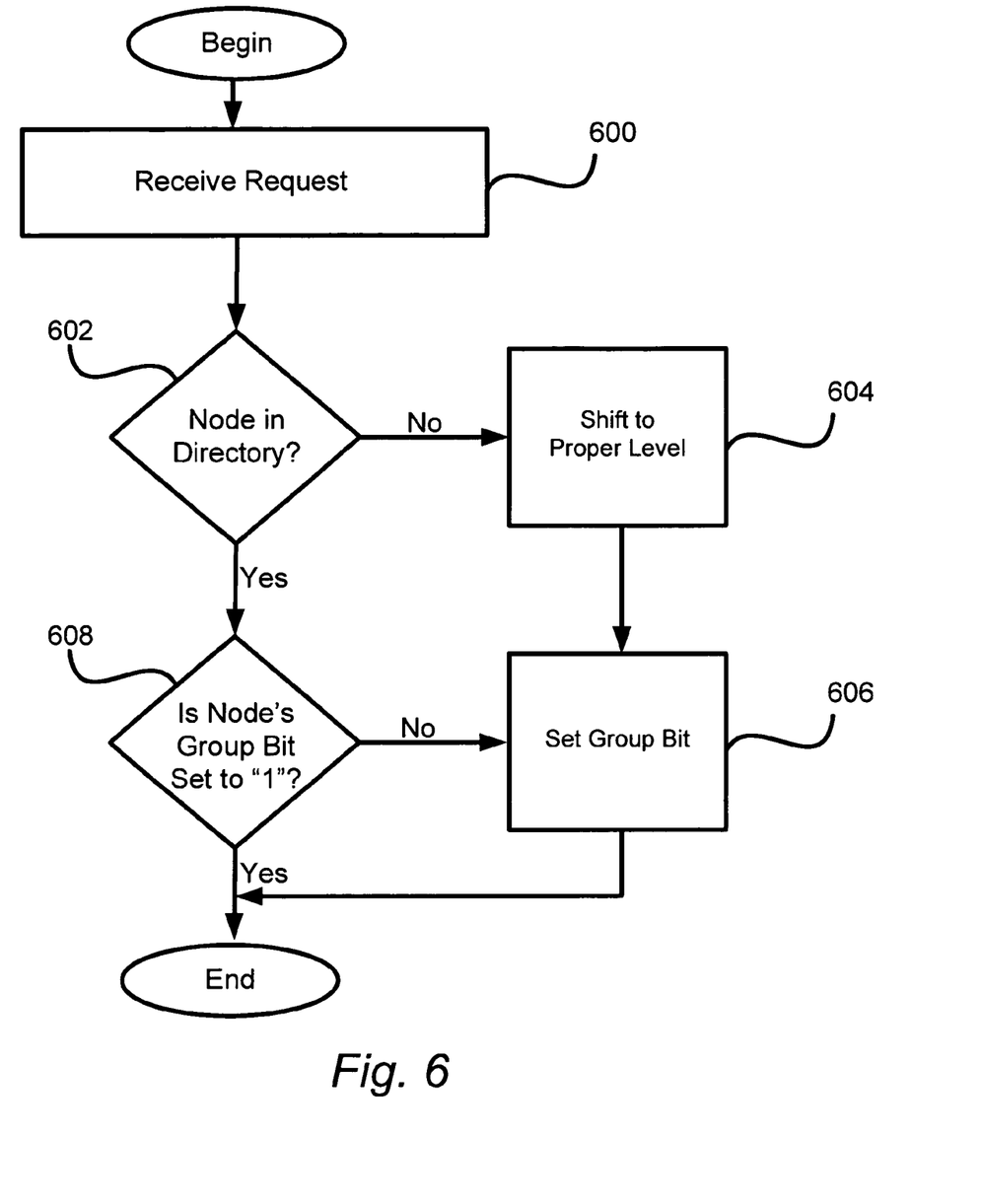
FIG. 6 shows a process of maintaining coherence between nodes in accordance with illustrative embodiments of the invention.

To that end, FIG. 6 shows a process of using the memory directory structure of FIG. 3 to maintain data coherency across the nodes 10. The process begins in response to a request from a requesting node 10 requesting data from a home node 10 (step 600). At substantially the same time, the data may be forwarded to the requesting node 10 in a conventional manner.

In response to the request, the membership module 28 determines if the requesting node 10 is within a group in the memory directory 25 (step 602) at its current state/level. In other words, the membership module 28 accesses the memory directory 25 to determine if the directory grid/array 40 has any information relating to a group within which the requesting node 10 is a member.

To that end, using the level data and group IDs, the membership module 28 ascertains the member nodes 10 of the groups. More specifically, the membership module 28 accesses the listing of groups for its node 10 and determines if the memory directory 25 is at a level that includes the group of the requesting node 10.

If the memory directory 25 has no information relating to the requesting node 10, then the requesting node 10 does not have the data requested from the home node 10. Accordingly, in that case, the process continues to step 604, in which the level module 30 iteratively increments/shifts the memory directory 25 to one or more higher levels until information relating to the requesting node 10 is located. Accordingly, the level module 30 shifts to the next succeeding level and, if no such information is at that level, it continues to shift to yet the next succeeding level. As noted, this process continues until the sought after information is located (i.e., the group of the requesting node is listed in the memory directory 25). After it iterates to the appropriate level, the modifier 34 sets the group bit of the requesting node 10 to a logical "1" (step 606).

Returning to step 602, if the requesting node is in the directory, the process continues to step 608, in which the parser 32 determines at step 606 if the bit in the memory directory 25 relating to the group of the requesting node 10 is set to logical "1." If that bit is not set, then the modifier 34 changes the bit to a logical "1" (step 606). Conversely, if the bit already is set (i.e., at least one node in the group of the requesting node has a copy of the data), the process ends. The memory directory 25 then remains at its current level/state (unless reset for some reason) for the next node 10 requesting data.

It should be noted that if the level module 30 shifts the directory 25 to a higher level, the bit for the group of the requesting node 10 should not already be set. If it were, then the directory 25 already would have been set to that level.

This process therefore maintains a memory directory 25 listing of all possible nodes 10 within the system 12 that may have shared data of the home node 10. Accordingly, if the home node 10 updates its cache, it simply may access the memory directory 25 to determine which group or groups of nodes 10 may have a shared copy of the data. At that point, the home node 10 may forward a coherence message to the relevant nodes 10 (i.e., nodes in the groups set to logical "1" in the directory 25) indicating that the data has been changed. Of course, as noted above, the nodes 10 receiving the message include at least those that have a shared copy. Other nodes 10 that do not have a shared copy, however, also may receive the message. For example, nodes 10 without the shared data that may receive the message may include:

nodes 10 within higher level groups having a sister node 10 (in the same group) with the data, and nodes 10 within groups at grid-blocks that intentionally but incorrectly are suggested to have the data, as discussed above with regard to FIG. 3.

Accordingly, as noted above, the hierarchical levels are considered to be levels of coarseness. Higher levels therefore are expected, in many but not all instances, to produce more unnecessary coherence messages than those produced by lower levels. Accordingly, illustrative embodiments start at less coarse levels to mitigate the number of such messages.

Despite the potential for some unnecessary data transmission within the system 12, this process should reduce the overhead for large multi-processor, multi-node systems 12. For example, some prior art systems may maintain a memory directory 25 having one bit assigned per each remote node 10. A bit is set to logical "1" if that remote node 10 has requested data from the home node 10. If that system has 24 nodes 10 that each have one microprocessor 16 with one block, then the prior art overhead for the grid portion is at least 24 bits for each node 10, for a total overhead of 576 bits (i.e., 24 bits multiplied by 24 processors). Storage overhead for illustrative embodiments (e.g., using the system of FIG. 3), however, would be six bits for each node 10, for a total overhead of 144 bits (six bits multiplied by 24 nodes 10). Illustrative embodiments of this example therefore save 400% of the overhead. Those skilled in the art therefore should recognize the more significant absolute overhead savings in larger systems (e.g., those having 16,000 nodes 10 with multiple microprocessors 16 and multiple blocks).

In some embodiments, the memory directory 25 may have a "upper bit" in addition to the sets of bits for the columns and rows, and the level bits. In such embodiments, each level is divided into an "upper portion" and a "lower portion." For example, if a level has groups 0-9, then the upper portion may have groups 5-9, while the lower portion may have groups 0-4. If the upper bit is set to logical "1," the grid-blocks on the grid represent groups in the upper portion of that level. Conversely, if the upper bit is set to logical "0," then the grid represents the groups in the lower portion of that level. The memory controller 24 therefore takes the upper bit into account when executing the processes described above.

Various embodiments of the invention may be implemented at least in part in any conventional computer programming language. For example, some embodiments may be implemented in a procedural programming language (e.g., "C"), or in an object oriented programming language (e.g., "C++"). Other embodiments of the invention may be implemented as preprogrammed hardware elements (e.g., application specific integrated circuits, FPGAs, and digital signal processors), or other related components.

In an alternative embodiment, the disclosed apparatus and methods (e.g., see the various flow charts described above) may be implemented as a computer program product for use with a computer system. Such implementation may include a series of computer instructions fixed either on a tangible medium, such as a computer readable medium (e.g., a diskette, CD-ROM, ROM, or fixed disk) or transmittable to a computer system, via a modem or other interface device, such as a communications adapter connected to a network over a medium.

The medium may be either a tangible medium (e.g., optical or analog communications lines) or a medium implemented with wireless techniques (e.g., WIFI, microwave, infrared or other transmission techniques). The series of computer instructions can embody all or part of the functionality previously described herein with respect to the system.

Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies.

Among other ways, such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). Of course, some embodiments of the invention may be implemented as a combination of both software (e.g., a computer program product) and hardware. Still other embodiments of the invention are implemented as entirely hardware, or entirely software.

Although the above discussion discloses various exemplary embodiments of the invention, it should be apparent that those skilled in the art can make various modifications that will achieve some of the advantages of the invention without departing from the true scope of the invention.

What is claimed is:

1. A method of maintaining data coherency in a computer system having a plurality of processing nodes, each processing node including at least one computer processor and a local memory, a subset of the processing nodes cooperating on a common task, the method comprising:

grouping the processing nodes into a plurality of node groups, each node group having a level, wherein each node group in a lowest level consists of a single processing node in the subset, and each node group that has a given level other than the lowest level consists of a fixed number of node groups, each node group in the fixed number of node groups having a level that is lower than the given level, there being at least one node group having a level other than the lowest level;

in each node of the subset, storing a data record comprising a memory directory, each memory directory having (1) data indicating a first level and (2) data relating to a plurality of node groups having that level;

receiving, in a given node, a request from a requesting node to obtain a copy of a portion of the local memory of the given node, the given node hereinafter called the home node;

determining whether the memory directory of the home node includes data relating to a node group that is associated with the requesting node; and when the memory directory does not include such data, setting the memory directory of the home node to have (1) data indicating a second, higher level and (2) data relating to a plurality of node groups at the higher level, wherein one node group of the plurality of node groups at the higher level is associated with the requesting node, and wherein setting the memory directory does not change its size, to save memory space required to store the memory directory.

2. The method as defined by claim 1 wherein each processing node in the subset is a member of at least one node group in each level.

3. The method as defined by claim 1 wherein each node group in the higher level comprises a plurality of node groups in the lower level, each lower level node group being a part of at least one node group in the higher level.

4. The method as defined by claim 1 further comprising determining if the requesting node is a member of a requesting group in the plurality of node groups at the higher level after setting the directory of the home node to have data relating to the plurality of node groups at the higher level.

5. The method as defined by claim 4 further comprising forwarding a coherence message to at least one of the nodes in the requesting group if it is determined that the requesting node is a member of the requesting group, the coherence message having information relating to the state of the requested data.

6. The method as defined by claim 1 wherein the requesting node is a member of a given node group, the given node group being one of the plurality of node groups in the directory of the home node, the method further comprising:

determining if the directory of the home node has data indicating that one of the members of the given node group has access to the data requested from the requesting node; and modifying the directory of the home node to have data indicating such access if the directory of the home node does not have data indicating such access.

7. The method as defined by claim 1 wherein the directory of the home node has a multi-dimensional data structure for storing information relating to the different node groups.

8. The method as defined by claim 1 further comprising increasing the level of the directory of the home node until it has been determined that the requesting node is a member of at least one group identified by the directory of the home node.

9. A memory controller for maintaining data coherency in a home node of a computer system having a plurality of processing nodes, each processing node including at least one computer processor and a local memory, the memory controller comprising:
- a grouping module that groups the plurality of processing nodes into a plurality of node groups, each node group having a level, wherein each node group in a lowest level consists of a single processing node in the subset, and each node group that has a given level other than the lowest level consists of a fixed number of node groups, each node group in the fixed number of node groups having a level that is lower than the given level, there being at least one node group having a level other than the lowest level;
- in each node of the subset, a memory controller that maintains a data record comprising a memory directory, the memory directory having (1) data indicating a first level and (2) data relating to a plurality of node groups having that level;
- a membership module operatively coupled with the grouping module, the membership module determining, in response to the home node receiving a request from a requesting node to obtain a copy of a portion of the local memory of the home node, whether the memory directory of the home node includes data relating to a node group that is associated with the requesting node; and
- a level module operatively coupled with the membership module, the level module setting the memory directory of the home node to have (1) data indicating a second, higher level and (2) data relating to a plurality of node groups at the higher level, wherein one node group of the plurality of node groups at the higher level is associated with the requesting node, and wherein setting the memory directory does not change its size, to save memory space required to store the memory directory,
- one or more of the modules being formed at least in part from hardware of the processing node.

10. The memory controller as defined by claim 9 wherein each processing node is a member of at least one node group in each level.

11. The memory controller as defined by claim 9 wherein each node group in the higher level comprises a plurality of node groups in the lower level, each lower level node group being a part of at least one node group in the higher level.

12. The memory controller as defined by claim 9 wherein the membership module determines if the requesting node is a member of a requesting group in the plurality of node groups at the higher level after setting the directory of the home node to have data relating to the plurality of node groups at the higher level.

13. The memory controller as defined by claim 12 further comprising an output for forwarding a coherence message to at least one of the nodes in the requesting group if it is determined that the requesting node is a member of the requesting group, the coherence message having information relating to the state of the requested data.

14. The memory controller as defined by claim 9 wherein the requesting node is a member of a given node group, the given node group being one of the plurality of node groups in the directory of the home node, the memory controller further comprising:
- a parser that determines if the directory of the home node has data indicating that one of the members of the given node group has access to the data requested from the requesting node; and
- a modifier operatively coupled with the parser, the modifier modifying the directory of the home node to have data indicating such access if the directory of the home node does not have data indicating such access.

15. The memory controller as defined by claim 9 wherein the level module increases the level of the directory of the home node until it has been determined that the requesting node is a member of at least one group identified by the directory of the home node.

16. A computer program product for maintaining data coherency by and in a computer system having a plurality of processing nodes, each processing node including at least one computer processor and a local memory, a subset of the computer nodes cooperating on a common task, the computer program product comprising a non-transitory tangible computer-usable storage medium having computer readable program code thereon, the computer readable program code comprising:
- program code for grouping the processing nodes into a plurality of node groups, each node group having a level, wherein each node group in a lowest level consists of a single processing node in the subset, and each node group that has a given level other than the lowest level consists of a fixed number of node groups, each node group in the fixed number of node groups having a level that is lower than the given level, there being at least one node group having a level other than the lowest level;
- program code for storing, in each node of the subset, a data record comprising memory directory that maintains a record of other nodes in the subset, each memory directory having (1) data indicating a first level and (2) data relating to a plurality of node groups at that level;
- program code for receiving, in a given node, a request from a requesting node to obtain a copy of a portion of the local memory of the given node, the given node hereinafter called the home node;
- program code for determining whether the memory directory of the home node includes data relating to a node group that is associated with the requesting node; and
- program code for setting the memory directory of the home node, when the memory directory does not include such data, to have (1) data indicating a second, higher level and (2) data relating to a plurality of node groups at the higher level, wherein one node group of the plurality of node groups at the higher level is associated with the requesting node, and wherein setting the memory directory does not change its size, to save memory space required to store the memory directory.

17. The computer program product as defined by claim 16 wherein each processing node in the subset is a member of at least one node group in each level.

18. The computer program product as defined by claim 16 wherein each node group in the higher level comprises a plurality of node groups in the lower level, each lower level node group being a part of at least one node group in the higher level.

19. The computer program product as defined by claim 16 further comprising program code for determining if the requesting node is a member of a requesting group in the plurality of node groups at the higher level after the directory of the home node is set to have data relating to the plurality of node groups at the higher level.

20. The computer program product as defined by claim 19 further comprising program code for forwarding a coherence message to at least one of the nodes in the requesting group if it is determined that the requesting node is a member of the requesting group, the coherence message having information relating to the state of the requested data.

21. The computer program product as defined by claim 16 wherein the requesting node is a member of a given node group, the given node group being one of the plurality of node groups in the directory of the home node, the computer program product further comprising:

program code for determining if the directory of the home node has data indicating that one of the members of the given node group has access to the data requested from the requesting node; and     program code for modifying the directory of the home node to have data indicating such access if the directory of the home node does not have data indicating such access.

22. The computer program product as defined by claim 16 further comprising program code for increasing the level of the directory of the home node until it has been determined that the requesting node is a member of at least one group identified by the directory of the home node.

23. The computer program product as defined by claim 16 wherein each node has a physical location and at least one node that is physically close, the program code for storing a directory of the home node comprising program code for grouping nodes with its relative neighbors.

\* \* \* \* \*